United States Patent [19]

Hiraishi et al.

[11] Patent Number: 5,713,812
[45] Date of Patent: Feb. 3, 1998

[54] DIFFERENTIAL APPARATUS

[75] Inventors: Kenji Hiraishi; Masahiko Asahi, both of Tochigi-ken, Japan

[73] Assignee: Tochigi Fuji Sangyo Kabushiki Kaisha, Japan

[21] Appl. No.: 707,057

[22] Filed: Sep. 3, 1996

[30] Foreign Application Priority Data

Sep. 19, 1995 [JP] Japan ................... 7-240147

[51] Int. Cl.⁶ ........................ F16H 1/42; B60K 17/20
[52] U.S. Cl. ............................ 475/252; 475/249
[58] Field of Search ........................ 475/249, 252

[56] References Cited

U.S. PATENT DOCUMENTS

| | | | |
|---|---|---|---|
| 1,389,580 | 9/1921 | Davis | 475/252 |
| 1,389,720 | 9/1921 | Ward | 74/464 |
| 2,269,734 | 9/1942 | Powell | 475/252 O |
| 2,791,919 | 5/1957 | Wildhaber . | |
| 2,869,399 | 1/1959 | Miles . | |
| 3,071,314 | 1/1963 | Flanagan . | |
| 3,251,244 | 5/1966 | Nickell . | |
| 3,412,632 | 11/1968 | McFiggans | 475/252 X |
| 3,768,336 | 10/1973 | Wharton | 475/252 OR |
| 4,776,234 | 10/1988 | Shea | 475/150 OR |
| 4,777,838 | 10/1988 | Aarestad | 74/462 X |
| 4,781,078 | 11/1988 | Blessing et al. . | |
| 4,838,118 | 6/1989 | Binkley | 475/150 X |
| 4,954,122 | 9/1990 | Nakao et al. . | |
| 5,019,021 | 5/1991 | Janson | 475/150 OR |
| 5,021,038 | 6/1991 | Beigang | 475/150 OR |
| 5,030,181 | 7/1991 | Keller | 475/150 OR |

(List continued on next page.)

FOREIGN PATENT DOCUMENTS

| | | |
|---|---|---|
| 130 806 | 1/1985 | European Pat. Off. . |
| 1105103 | 11/1955 | France . |
| 2126823 | 10/1972 | France . |
| 2553169 | 4/1985 | France . |
| 369548 | 2/1923 | Germany . |
| 1164187 | 2/1964 | Germany . |
| 2305305 | 8/1974 | Germany . |
| 28 48 206 | 5/1980 | Germany . |
| 39 31 745 | 3/1991 | Germany . |
| 40 13 196 | 10/1991 | Germany . |
| 40 27 368 | 3/1992 | Germany . |
| 4223374 | 7/1992 | Germany . |
| 51-144637 | 11/1976 | Japan . |
| 54-54765 | 4/1979 | Japan . |
| 54-69257 | 5/1979 | Japan . |
| 55-3058 | 1/1980 | Japan . |
| 55-64550 | 5/1980 | Japan . |
| 59-141254 | 9/1984 | Japan . |
| 60-81275 | 6/1985 | Japan . |
| 62-126645 | 8/1987 | Japan . |
| 62-200071 | 9/1987 | Japan . |
| 63-130961 | 6/1988 | Japan . |
| 2-38733 | 2/1990 | Japan . |
| 3-68634 | 7/1991 | Japan . |
| 4-64747 | 2/1992 | Japan . |
| 6-58379 | 3/1994 | Japan . |
| 2010145 | 1/1991 | Russian Federation . |
| 1442-772 | 1/1987 | U.S.S.R. . |
| 1421-933 | 3/1987 | U.S.S.R. . |
| 1256990 | 11/1970 | United Kingdom . |
| WO 85/04936 | 11/1985 | WIPO . |
| WO 86/02420 | 4/1986 | WIPO . |

*Primary Examiner*—Dirk Wright
*Attorney, Agent, or Firm*—Graham & James LLP

[57] ABSTRACT

This differential apparatus has a differential casing rotated by an engine, side gears on an output side arranged within the differential casing and spline-connected to output shafts, pinion gears for connecting the gears, storing holes for slidably and rotatably storing the gears, a thrust block for receiving thrust forces of the output shafts, washers, respectively opposed to the gears and movably arranged with respect to the thrust block in an axial direction, and a spring for pressing the washers, against the gears, and giving frictional torque to said gears. Accordingly, no thrust forces of the output shafts are inputted to the washer members and the spring and initial torque is released from influences of the thrust forces of the output shafts so that stable differential limiting characteristics can be obtained.

9 Claims, 10 Drawing Sheets

U.S. PATENT DOCUMENTS

| | | | |
|---|---|---|---|
| 5,078,660 | 1/1992 | Williams et al. | 475/252 OR |
| 5,083,987 | 1/1992 | Korner et al. | 475/252 X |
| 5,102,378 | 4/1992 | Gobert . | |
| 5,122,101 | 6/1992 | Tseng | 475/249 |
| 5,147,252 | 9/1992 | Mace et al. | 475/252 |
| 5,156,578 | 10/1992 | Hirota . | |
| 5,169,370 | 12/1992 | Dye et al. | 475/252 |
| 5,282,775 | 2/1994 | Teraoka . | |
| 5,295,923 | 3/1994 | Takefuta | 475/160 X |
| 5,310,389 | 5/1994 | Sato | 74/462 X |
| 5,326,333 | 7/1994 | Niizawa et al. . | |
| 5,366,421 | 11/1994 | Hirota . | |
| 5,415,601 | 5/1995 | Cilano | 475/252 |
| 5,458,547 | 10/1995 | Teraoka et al. | 475/89 |
| 5,556,351 | 9/1996 | Hiraisha et al. . | |

DIFFERENTIAL APPARATUS

BACKGROUND OF THE INVENTION

This invention relates to a differential apparatus used in a vehicle.

A differential apparatus 201 as shown in FIG. 1 is described in European patent application No. 0130806.

This differential apparatus 201 has a differential casing 203, helical side gears 205, 207 on an output side, plural pinion gear sets composed of helical pinion gears 209, 211 arranged on radial outer sides of these helical side gears 205, 207, etc.

The pinion gears 209, 211 are respectively stored slidably and rotatably into storing holes 213, 215 of the differential casing 203. While the pinion gears 209, 211 are engaged with each other, these pinion gears are separately engaged with the side gears 205, 207 so that the side gears 205, 207 are connected to each other. The side gears 205, 207 are respectively spline-connected to output shafts 231, 233.

Driving force of an engine for rotating the differential casing 203 is transmitted from the pinion gears 209, 211 to a wheel side through the side gears 205, 207. When the difference in driving resistance between wheels is caused by a bad road, etc., the driving force of the engine is differentially distributed to each of the wheels by self rotation of each of the pinion gears 209, 211.

At this time, a differential limiting force of a torque responsive type is obtained by frictional resistance caused by an engaging reaction force applied to the pinion gears 209, 211 and frictional resistance caused by an engaging thrust force of the helical gears.

In the differential casing 203, a spacer portion 217 is formed on an axial inner side of the side gears 205, 207. A pair of thrust blocks 219, 219 for pressing the output shafts 231, 233 of the side gears 205, 207 are arranged in an inner circumference of this spacer portion 217. Six springs 221 are arranged between the thrust blocks 219, 219. These springs 221 press the thrust blocks 219, 219 against the side gears 205, 207 so that a constant initial torque (a differential limiting torque) is generated by frictional resistance of the thrust blocks and the side gears.

The vehicle cannot be sufficiently escaped from a bad road by only the differential limiting force of a torque responsive type, but properties for escaping the vehicle from the bad road are greatly improved by this initial torque.

However, sliding portions 223, 223 for generating the initial torque by the spring 221, and sliding portions 225, 225 receiving thrust force of the output shaft 231 are formed in the thrust blocks 219, 219 as the same member. Therefore, there is the possibility that the thrust blocks 219, 219 receiving large thrust force from the output shaft 231 are moved such that these thrust blocks are separated from the side gears 205, 207 against biasing force of the spring 221. Therefore, the frictional resistances of the thrust blocks 219, 219 and the side gears 205, 207 are increased and decreased so that the initial torque vanishes, or irregularly varies. Accordingly, there is a fear of unstabilizing differential limiting characteristics.

SUMMARY OF THE INVENTION

Therefore, an object of the present invention is to provide a differential apparatus for releasing initial torque from the influence of thrust force of an output shaft and obtaining stable differential limiting characteristics.

To achieve the above object, a differential apparatus in the present invention comprises a differential casing rotated by driving force of an engine; a pair of side gears on an output side rotatably supported within the differential casing and respectively spline-connected to output shafts; at least one pair of pinion gears which have first gear portions arranged on a radial outer side of said side gears and separately engaged with the side gears and have second gear portions engaged with each other; storing holes formed in the differential casing and slidably and rotatably storing the respective pinion gears; a pair of washer members respectively opposed to the side gears in radial outside portions of the output shafts and movably arranged in an axial direction so as not to receive thrust forces from the output shafts; and a spring arranged between said washer members and giving frictional torque to both the side gears through the washer members.

The respective washer members are pressed against both the side gears by the spring and initial torque is obtained by frictional resistance thereof. The respective washer members do not receive the thrust forces of the output shafts. Accordingly, no thrust forces of the output shafts are inputted to the washer members and the spring so that vanishment and variation of the initial torque caused by the thrust forces of the output shafts are prevented and stable differential limiting characteristics are obtained.

In addition to this, the respective washer members and the spring are arranged in radial outside portions of the output shafts. Accordingly, an initial torque generating mechanism constructed by the washer members and the spring can be shortened in the axial direction in comparison with a conventional example in which the washer members and the spring are arranged in the axial direction. Thus, the differential casing can be made compact.

The pair of washer members are engaged with a washer supporting member rotatable in relation to the side gears and are rotated together with the washer supporting member in a circumferential direction.

Thus, it is possible to prevent the respective washer members from being rotated in association with the side gears. Further, stable frictional resistance is obtained between the washer members and the side gears so that a stabler differential limiting force is obtained.

In addition to this, since the respective washer members are not rotated in association with the side gears, sliding movements of the respective washer members and the spring caused by relative rotations of the side gears are prevented so that wearing, burning, etc. caused by a line contact sliding movement between an end portion of the spring and each of the washer members are avoided.

Further, a thrust block receiving the thrust forces of the output shafts and pressed against the side gears on a partner side, and a thrust block for hitting the thrust forces of the respective output shafts against each other can be also rotatably arranged in relation to the side gears on an axial inner side of both the side gears.

No thrust forces of the output shafts are inputted to the washer members and the spring even when the thrust block receiving the thrust forces of the output shafts and pressed against the side gears on a partner side, and the thrust block for hitting the thrust forces of the respective output shafts against each other are arranged. Accordingly, vanishment and variation of the initial torque caused by the thrust forces of the output shafts are prevented and stable differential limiting characteristics are obtained.

The thrust block can be set to the washer supporting member rotatable in relation to the side gears; and the pair of washer members can be movably engaged with the thrust block in the axial direction by an engaging portion formed between the pair of washer members and the thrust block.

Further, the differential casing can be set to the washer supporting member rotatable in relation to the side gears; and the pair of washer members can be movably engaged with the differential casing in the axial direction by an engaging portion formed between the pair of washer members and the differential casing.

Further, the pinion gears can be set to the washer supporting member rotatable in relation to the side gears; and the pair of washer members can be movably engaged with the pinion gears in the axial direction by engaging portions formed between the pair of washer members and the pinion gears.

The above constructions, the differential casing or the pinion gears are set to the washer supporting member, are effective in the washer engaging structure in the differential apparatus no thrust block is formed.

At least one pinion gear of the pair of pinion gears can be formed to have a shaft portion having a small diameter and avoiding an interference with the side gears engaged with the pinion gears on a partner side between the first and second gear portions. For example, the pair of pinion gears are constructed by a short pinion gear having no shaft portion between the first and second gear portions, and a long pinion gear in which a shaft portion having a small diameter and avoiding an interference with the side gears engaged with this short pinion gear is formed between the first and second gear portions. The second gear portions can be set to be engaged with each other on one axial outer side of both the side gears. Further, the pair of pinion gears can be constructed by pinion gears having an equal length. These pinion gears having an equal length have a shaft portion having a small diameter and avoiding an interference with the side gears engaged with the pinion gears on a partner side between the first and second gear portions. The second gear portions are engaged with each other on both axial sides of the side gears.

Since the differential apparatus has the pinion gears having the shaft portion, an engaging portion (second gear portion) between the pinion gears can be located on the axial outer side of the pair of side gears on the output side, and the pair of side gears can be adjacent to each other. Accordingly, the differential apparatus including the washer members and the spring can be made compact in comparison with a conventional differential apparatus having a spacer portion in the differential casing. Further, even when the present invention is applied to such a differential apparatus, the initial torque generating mechanism constructed by the washer members and the spring can be shortened in the axial direction by arranging the respective washer members and the spring on the radial outer side of the output shafts. Namely, even when the present invention is applied to the differential apparatus having the pinion gears with such a shaft portion, effects of the differential apparatus can be easily obtained advantageously.

DESCRIPTION OF THE PREFERRED EMBODIMENTS

Figure 1:
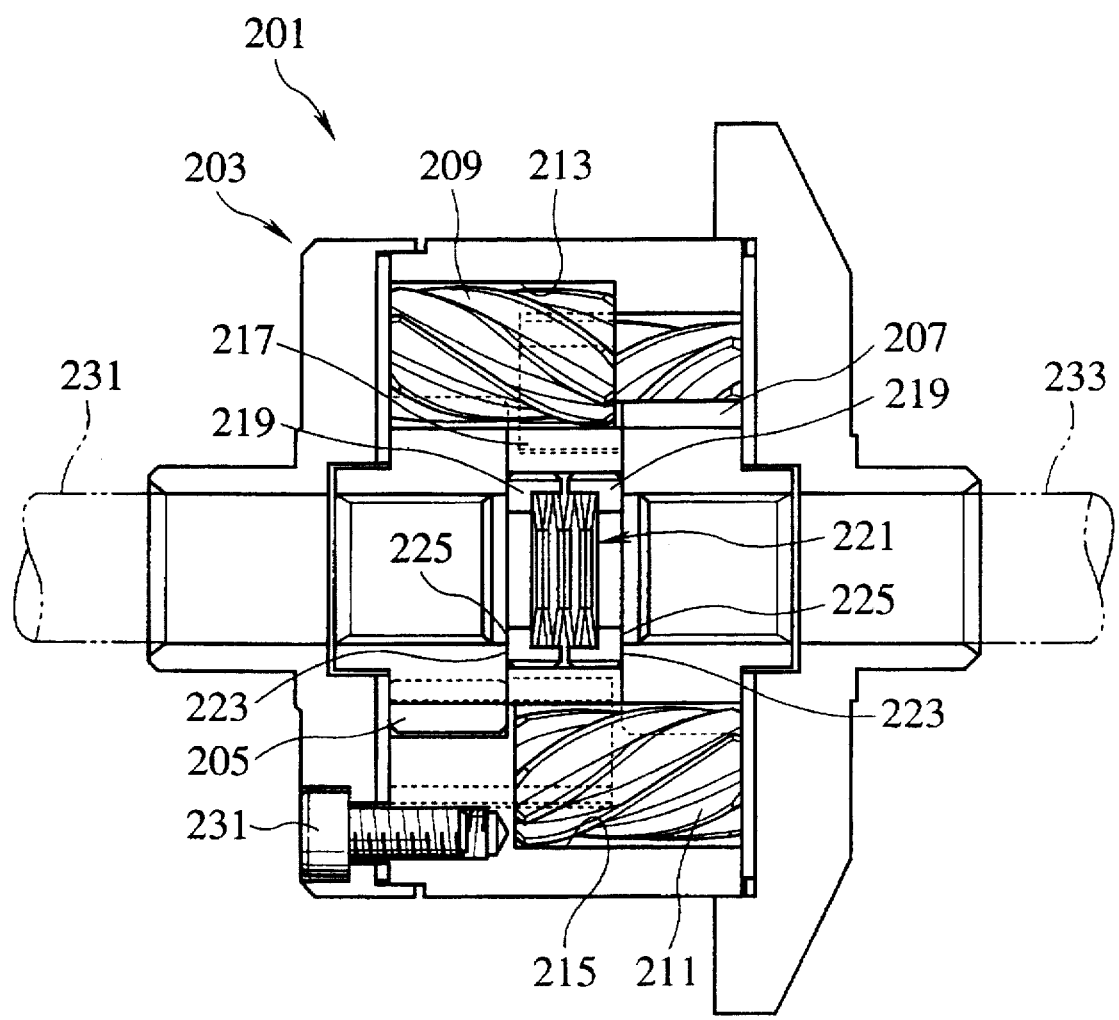
FIG. 1 is a cross-sectional view of a differential apparatus in a general example.

A first embodiment form of the present invention will next be explained with reference to FIGS. 2 to 4. FIG. 2 shows a differential apparatus 1 in this embodiment form. Left-hand and right-hand directions are those in FIG. 1 and members having no reference numerals, etc. are not illustrated.

As shown in FIG. 2, a differential casing 3 of the differential apparatus 1 is constructed by fixing a casing body 5 and a cover 7 by a bolt 9. A ring gear is fixed to the differential casing 3 and is engaged with an output gear of a power transmission system for transmitting driving force of an engine. Thus, the differential casing 3 is rotated by the driving force of the engine.

The differential apparatus 1 is arranged in the interior of a differential carrier. Boss portions 11, 13 of the differential casing 3 are supported by the differential carrier through bearings. An oil reservoir is arranged in the differential carrier. A lower portion of the differential apparatus 1 is dipped into this oil reservoir in a rest state. When the differential apparatus 1 is rotated, an oil is splashed upward from the oil reservoir.

Each of side gears 15, 17 on an output side is arranged within the differential casing 3 and is constructed by a helical gear.

Hollow boss portions 19, 21 of the respective side gears 15, 17 are rotatably supported by supporting portions 23, 25 of the differential casing 3. Large diameter portions 27, 29 are formed inside the boss portions 19, 21. A thrust block (a washer supporting member) 31 is arranged over inner circumferences of these large diameter portions 27, 29 such that the thrust block 31 is rotatable in relation to the side gears 15, 17. The thrust block 31 supports each of free ends of the side gears 15, 17 to perform centering thereof.

The boss portion 19 of the side gear 15 is spline-connected to an output shaft 16 of one side wheel. The boss portion 21 of the side gear 17 is spline-connected to an output shaft 18 of another side wheel. Thrust washers 33 are respectively arranged between the side gears 15, 17 and the differential casing 3.

Engaging stepped portions 16a, 18a are formed in the respective output shafts 16, 18. The engaging stepped portions 16a, 18a have an outside diameter gradually reduced and hit against step difference portions 15a, 17a formed in inner diameter portions of the boss portions 19, 21 of the side gears 15, 17 so that movements of the respective output shafts 16, 18 of the side gears 15, 17 on an interior side of the differential casing 3 are restricted. Sliding portions 35, 35 with respect to the side gears 15, 17 receive thrust forces of the respective output shafts 16, 18 through the thrust block 31. When the output shafts 16, 18 hit against each other through the thrust block 31, sliding portions with respect to the output shafts 16, 18 and the thrust block 31 receive the thrust forces of the respective output shafts 16, 18.

Figure 2:
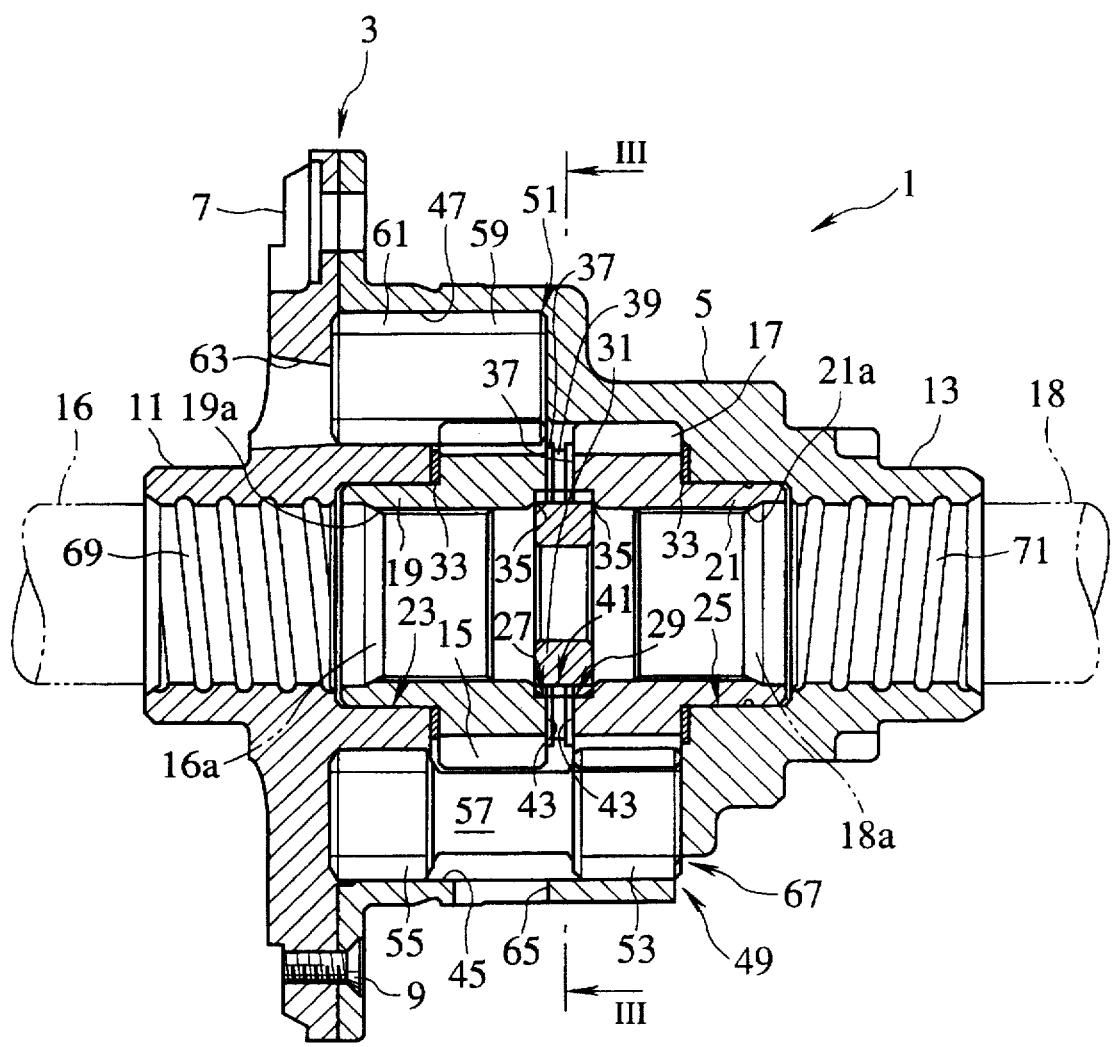
FIG. 2 is a cross-sectional view showing a first embodiment form of the present invention.
Figure 3:
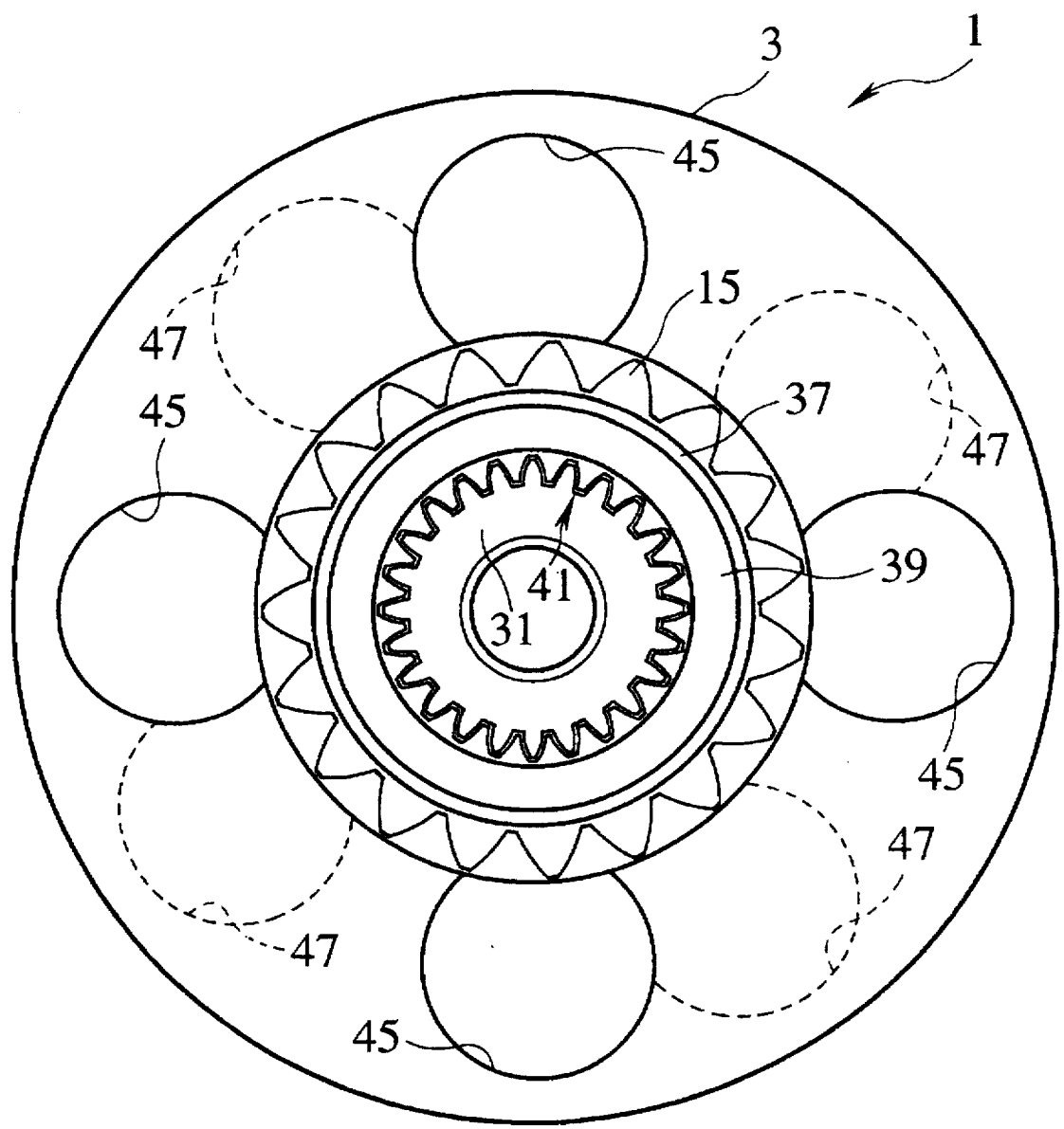
FIG. 3 is a cross-sectional view taken along line III—III of FIG. 2.
Figure 4:
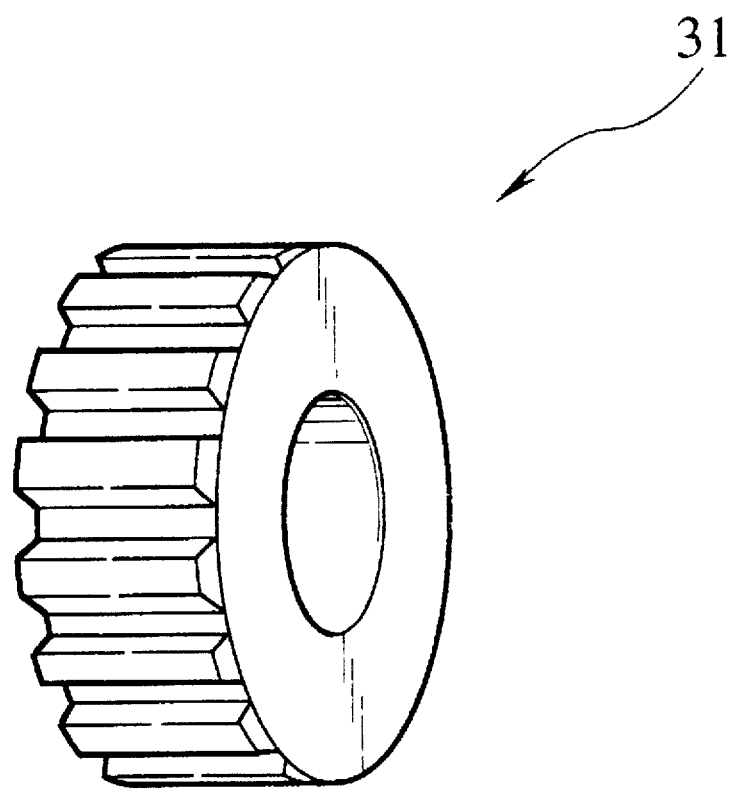
FIG. 4 is a perspective view of a thrust block used in the embodiment form of FIG. 2.

As shown in FIGS. 2 and 3, an initial torque generating mechanism is arranged between the side gears 15 and 17 and is constructed by two washers 37, 37 and a spring (for example, a belleville spring) 39 supported between these washers. The washers 37, 37 are respectively opposed to the side gears 15, 17 in radial outside portions of the output shafts 16, 18 (on an outer circumferential side of the thrust block 31) so as not to receive the thrust forces from the output shafts 16, 18. Each of the washers 37, 37 is movably connected to the thrust block 31 in an axial direction by a spline portion (an engaging portion) 41 formed between each of the washers 37, 37 and the thrust block 31. An inner circumference of the spring 39 is guided by an outer circumference of the thrust block 31. Namely, the washers 37, 37 and the spring 39 are arranged in positions shifted from the thrust block 31 in the radial direction.

The respective washers 37, 37 are pressed against sliding portions 43, 43 with respect to the side gears 15, 17 by the spring 39.

Thus, the sliding portions 43, 43 for generating initial torque by the spring 39, and the sliding portions 35, 35 receiving the thrust forces of the output shafts 16, 18 are separately arranged in the washers 37, 37 and the thrust block 31 relatively movable in the axial direction such that no washers 37, 37 receive the thrust forces of the output shafts 16, 18. Accordingly, no initial torque is interfered with the thrust forces of the output shafts 16, 18.

Four sets of long and short storing holes 45, 47 are formed in the differential casing 3 in a circumferential direction. Long and short pinion gears 49, 51 each constructed by a helical gear are slidably and rotatably stored into the storing holes 45, 47.

The long pinion gear 49 is constructed by a first gear portion 53, a second gear portion 55 and a shaft portion 57 having a small diameter and connecting these first and second gear portions to each other. The first gear portion 53 is engaged with the side gear 17. The short pinion gear 51 is constructed by a first gear portion 59 and a second gear portion 61. No shaft portion is formed between the first gear portion 59 and the second gear portion 61. The first gear portion 59 is engaged with the side gear 15. The second gear portion 61 is engaged with the second gear portion 55 of the pinion gear 49. The second gear portions 55, 61 of the long and short pinion gears 49, 51 are located on one outer side of the pair of side gears 15, 17 in the rotating direction thereof. The pair of side gears 17, 15 engaged with the first gear portions 53, 59 of the respective pinion gears 49, 51 are adjacent to each other through the washers 37, 37 and the spring 39.

The driving force of the engine for rotating the differential casing 3 is distributed from the pinion gears 51, 49 to each of the output shafts through the side gears 15, 17. For example, when the difference in driving resistance between wheels is caused during running on a bad road, the driving force of the engine is differentially distributed onto each wheel side by self rotation of each of the pinion gears 49, 51.

While torque is transmitted, addendums of the respective pinion gears 49, 51 are pressed against wall faces of the storing holes 45, 47 by engaging reaction forces with the side gears 17, 15 so that frictional resistance is caused. The frictional resistance is also caused by the engaging thrust force of the helical gear between each of the pinion gears 49, 51 and each of end faces of the storing holes 45, 47. The frictional resistance is also caused through the thrust washer 33 between the side gears 15, 17 and the differential casing 3. The frictional resistance is further caused through the thrust block 31 between the side gears 15 and 17.

The differential limiting function of a torque responsive type is obtained by these frictional resistances.

Further, the frictional resistance is caused by pressing force of the spring 39 between the washers 37, 37 and the side gears 15, 17. A constant differential limiting force (initial torque) is obtained at any time by this frictional resistance in addition to the differential limiting function of a torque responsive type.

As shown in FIG. 2, openings 63, 65, 67 are formed in the differential casing 3 and spiral oil grooves 69, 71 are formed in inner circumferences of the boss portions 11, 13.

When the differential apparatus 1 is at rest, an oil dipped into the openings 63, 65, 67 and the oil grooves 69, 71 flows into the differential casing 3. When the differential apparatus 1 is rotated, the oil splashed upward from the oil reservoir and splashed back on an inner wall of the differential carrier flows into the differential carrier 3 from the openings 63, 65, 67 and the oil grooves 69, 71, etc.

The flowing oil is supplied to the storing holes 45, 47, engaging portions of the respective gears, the above sliding portions 35, 35, 43, 43, the washers 37, 37, the spline portion 41 of the thrust block 31, etc. so that these portions are lubricated.

The oil of the oil grooves 69, 71 is fed to the supporting portions 23, 25 of the side gears 15, 17, the thrust washer 33, etc. by rotating the differential casing 3 so that these portions are lubricated.

As mentioned above, the sliding portions 43, 43 for generating initial torque by the spring 39, and the sliding portions 35, 35 receiving the thrust forces of the output shafts 16, 18 are separately arranged in the washers 37, 37 and the thrust block 31 relatively movable in the axial direction such that no washers 37, 37 receive the thrust forces of the output shafts 16, 18. Accordingly, no initial torque is interfered with the thrust forces of the output shafts 16, 18.

Accordingly, a generating mechanism of the initial torque is released from influences of the thrust forces inputted from the output shafts 16, 18 so that, different from the general example, vanishment and variation of the initial torque are avoided and stable differential limiting characteristics are obtained.

Further, the washers 37, 37 are engaged with the side gears 15, 17 and the relatively rotatable thrust block 31 such that both the washers are rotated together with these members in a circumferential direction. Accordingly, it is possible to prevent the washers 37, 37 from being rotated in association with the side gears 15, 17. Thus, stable frictional resistance is obtained between the washers 37, 37 and the side gears 15, 17 so that a stabler differential limiting force is obtained.

Further, the respective washers 37, 37 and the thrust block 31 are movably engaged with each other (are connected to each other in a rotating direction) in the axial direction by the spline portion 41. Accordingly, it is possible to prevent a line contact sliding movement between an end portion of the spring 39 and the washers 37, 37 caused by a relative rotation of the side gears 15, 17 and wearing, burning, etc. caused by this line contact sliding movement.

Thus, the differential apparatus 1 is constructed as above.

With respect to a vehicle mounting the differential apparatus 1 thereon, the behavior of a vehicle body is improved by the differential limiting function of a torque responsive type when large torque is applied to the vehicle as at a starting time and an accelerating time. When a wheel on one side of the vehicle is raced on a bad road, etc., a large driving force is transmitted to the wheels on the other side by the stable initial torque as mentioned above so that properties for escaping the vehicle from the bad road are greatly improved.

Further, the initial torque generating mechanism is shortened in the axial direction by a construction in which, different from the general example, the washers 37, 37, the spring 39 and the thrust block 31 are arranged in the radial direction instead of the axial direction. Accordingly, it is possible to easily form the differential apparatus I extending in the axial direction and using the long pinion gear 49 having the shaft portion 57.

In addition to this, in the conventional example of FIG. 1, the differential casing 203 is divided into three members 225, 227, 229 and the spacer 217 of the side gears 205, 207 is formed integrally with the member 227.

Accordingly, in an assembly of the differential apparatus 201, the side gear 207 and the pinion gear 211 are first assembled into the member 225 and the member 227 is then fixed to the member 225. Thereafter, the thrust blocks 219, 219 supporting the spring 211 therebetween are arranged in an inner circumference of the spacer portion 217. Further, the side gear 205 and the pinion gear 209 are assembled and the member 229 is fixed by the bolt 231.

Thus, since the spacer portion 217 is integrated with the member 227, the differential casing 203 must be constructed by a three-divisional structure and an assembly order is further complicated as mentioned above.

However, in the differential apparatus 1, the thrust block 31, the washers 37, 37 and the spring 39 are floated and supported between the side gears 15 and 17 so that no complicated assembly order as in the conventional example is required. Further, the differential casing 3 can be constructed by a two-divisional structure so that cost of the differential apparatus is correspondingly reduced.

Further, since the differential apparatus 1 has the pinion gear 49 having the shaft portion 57, the second gear portions 55, 61 as mutual engaging portions of the pinion gears 49, 51 can be located on an axial outer side of the pair of output side gears 15, 17. The pair of side gears 15, 17 can be arranged such that these side gears are adjacent to each other. Further, the differential apparatus containing the washers 37, 37 and the spring 39 can be made compact in comparison with the conventional differential apparatus (see FIG. 1) having the spacer portion in the differential casing. The respective washers 37, 37 and the spring 39 are arranged outside the output shafts 16, 18 in the radial direction even when this invention is applied to such a differential apparatus 1. Accordingly, the initial torque generating mechanism constructed by the washers 37, 37 and the spring 39 can be shortened in the axial direction. Namely, effects of the present invention can be easily obtained advantageously even when the present invention is applied to the differential apparatus 1 having the pinion gear 49 with such a shaft portion 57.

Figure 5:
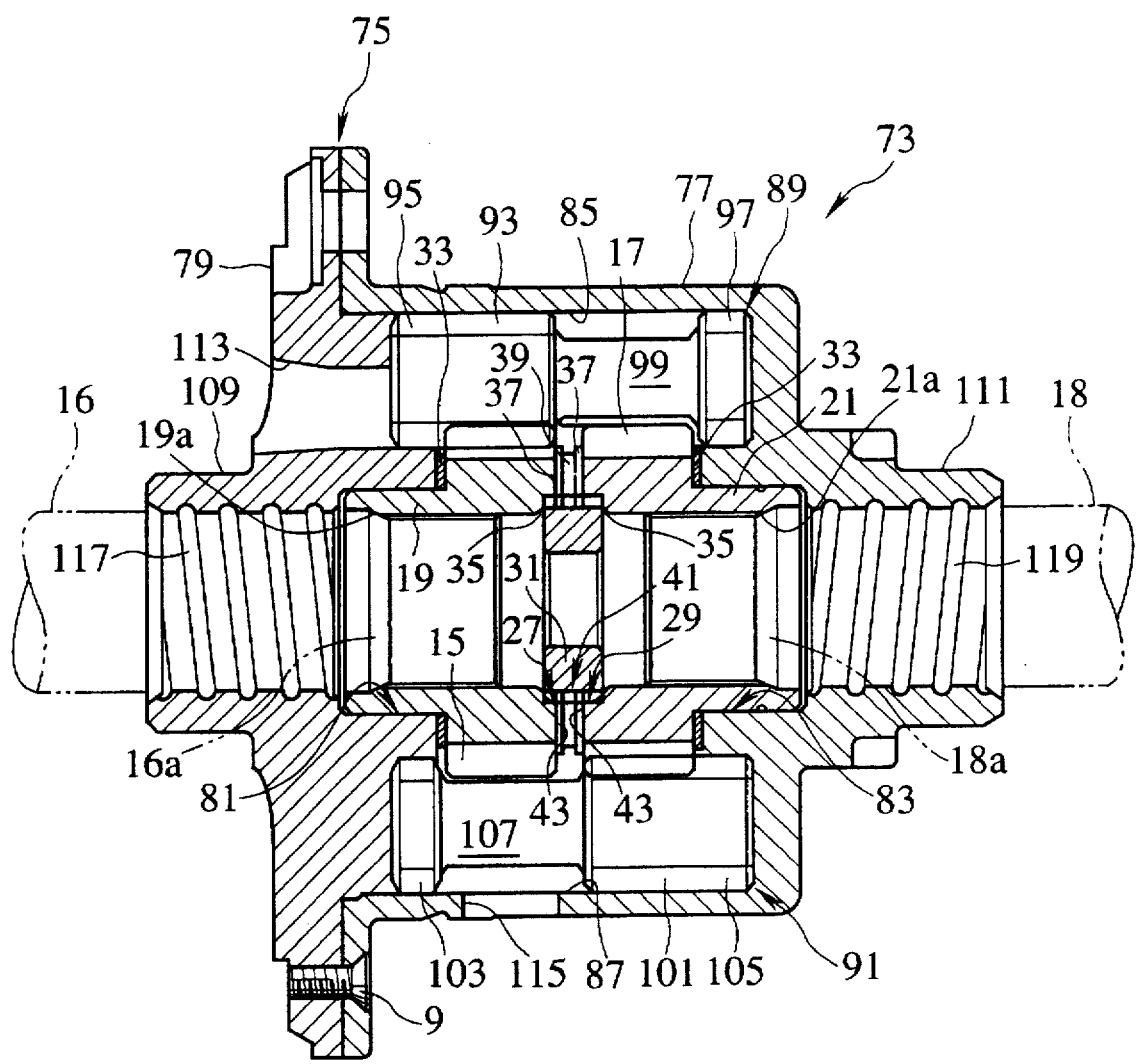
FIG. 5 is a cross-sectional view showing a second embodiment form of the present invention.

A second embodiment form of the present invention will next be explained with reference to FIG. 5. FIG. 5 shows a differential apparatus 73 in this embodiment form. Left-hand and right-hand directions are those in FIG. 5 and members having no reference numerals, etc. are not illustrated.

In an explanation of this embodiment form and FIG. 5, members having the same functions as members in the first embodiment form are designated by the same reference numerals and an explanation of these same functional members is omitted.

As shown in FIG. 5, a differential casing 75 of the differential apparatus 73 is constructed by fixing a casing body 77 and a cover 79 by a bolt 9. A ring gear is fixed to the differential casing 75 and is engaged with an output gear of a power transmission system for transmitting driving force of an engine. Thus, the differential casing 3 is rotated by the driving force of the engine.

Side gears 15, 17 on an output side each constructed by a helical gear are arranged within the differential casing 75.

Hollow boss portions 19, 21 of the respective side gears 15, 17 are rotatably supported by supporting portions 81, 83 of the differential casing 75. The side gears 15, 17 are arranged over large diameter portions 27, 29 of the boss portions 19, 21 and respective free ends of the side gears 15, 17 are supported by a thrust block (a washer supporting member) 31 to perform centering thereof. Sliding portions 35, 35 receive thrust forces of respective output shafts connected to the side gears 15, 17 through the thrust block 31.

An initial torque generating mechanism is constructed by two washers 37, 37 and a spring 39 supported between these washers and is arranged between the side gears 15 and 17. The washers 37, 37 are respectively opposed to the side gears 15, 17 in radial outside portions (on an outer circumferential side of the thrust block 31) of output shafts 16, 18 so as not to receive thrust forces from the output shafts 16, 18. The respective washers 37, 37 are movably connected to the thrust block 31 in the axial direction by a spline portion (an engaging portion) 41 formed between these washers and the thrust block 31. The respective washers 37, 37 are pressed against sliding portions 43, 43 with respect to the side gears 15, 17 by the spring 39.

Thus, the sliding portions 43, 43 for generating the initial torque by the spring 39 and the sliding portions 35, 35 receiving the thrust forces of the output shafts 16, 18 are separately arranged respectively in the washers 37, 37 and the thrust block 31 relatively movable in the axial direction such that no washers 37, 37 receive the thrust forces of the output shafts 16, 18. Accordingly, no initial torque is interfered with the thrust forces of the output shafts 16, 18.

In the differential casing 75, four sets of storing holes 85, 87 are formed in a circumferential direction. A pair of pinion gears 89, 91 each constructed by a helical gear are slidably and rotatably stored into these storing holes 85, 87.

One pinion gear 89 is constructed by a first gear portion 93, second gear portions 95, 97 and a shaft portion 99 having a small diameter and connecting the first gear portion 93 and the second gear portion 97. The first gear portion 93 is engaged with the side gear 15. The other pinion gear 91 is constructed by a first gear portion 101, second gear portions 103, 105 and a shaft portion 107 having a small diameter and connecting the first gear portion 101 and the second gear portion 103. The first gear portion 101 is engaged with the side gear 17. The second gear portions 103, 105 are respectively engaged with the second gear portions 95, 97 of the pinion gear 89. The second gear portions 95, 97, 103, 105 of the pinion gears 89, 91 are located outside the pair of side gears 15, 17 in a rotating axis direction thereof. The side gears 15, 17 are adjacent to each other through the washers 37, 37 and the spring 39.

Driving force of an engine for rotating the differential casing 75 is distributed from the pinion gears 89, 91 to each of output shafts through the side gears 15, 17. When the difference in driving resistance between wheels is caused during running on a bad road, etc., the driving force of the engine is differentially distributed to each wheel side by self rotation of each of the pinion gears 89, 91.

While torque is transmitted, addendums of the respective pinion gears 89, 91 are pressed against wall faces of the storing holes 85, 87 by engaging reaction forces with the side gears 15, 17 so that frictional resistance is caused. The frictional resistance is also caused by the engaging thrust force of the helical gear between each of the pinion gears 89, 91 and each of end faces of the storing holes 85, 87. The frictional resistance is also caused through a thrust washer 33 between the side gears 15, 17 and the differential casing 3. The frictional resistance is further caused through the thrust block 31 between the side gears 15 and 17.

The differential limiting function of a torque responsive type is obtained by these frictional resistances.

Further, the frictional resistance is caused by pressing force of the spring 39 between the washers 37, 37 and the side gears 15, 17. A constant differential limiting force (initial torque) is obtained at any time by this frictional resistance in addition to the differential limiting function of a torque responsive type.

The differential apparatus 73 is arranged in the interior of a differential carrier. Boss portions 109, 111 of the differential casing 75 are supported by the differential carrier through bearings. Openings 113, 115 are formed in the differential casing 75 and oil grooves 117, 119 having a spiral shape are formed in inner circumferences of the boss portions 109, 111.

An oil flows from the openings 113, 115 and the oil grooves 117, 119 into the differential casing 75 irrespective of a rotating time of the differential apparatus 73 and a stopping time of this rotation. The flowing oil is supplied to the storing holes 85, 87, engaging portions of the respective gears, the sliding portions 35, 35, 43, 43, the washers 37, 37, the spline portion 41 of the thrust block 31, etc. so that these portions are lubricated.

As mentioned above, the sliding portions 43, 43 for generating initial torque by the spring 39, and the sliding portions 35, 35 receiving the thrust forces of the output shafts 16, 18 are separately arranged in the washers 37, 37 and the thrust block 31 relatively movable in the axial direction such that no washers 37, 37 receive the thrust forces of the output shafts 16, 18. Accordingly, no initial torque is interfered with the thrust forces of the output shafts 16, 18.

Accordingly, a generating mechanism of the initial torque is released from influences of the thrust forces inputted from the output shafts so that, different from the conventional example, vanishment and variation of the initial torque are avoided and stable differential limiting characteristics are obtained.

Further, the washers 37, 37 are engaged with the side gears 15, 17 and the relatively rotatable thrust block 31 such that the washers are rotated together with these members in a circumferential direction. Accordingly, it is possible to prevent the washers 37, 37 from being rotated in association with the side gears 15, 17. Thus, stable frictional resistance is obtained between the washers 37, 37 and the side gears 15, 17 so that a stabler differential limiting force is obtained.

Thus, the differential apparatus 73 is constructed as above.

In a vehicle mounting the differential apparatus 73 thereon, the behavior of a vehicle body is improved by the differential limiting function of a torque responsive type when large torque is applied to the vehicle as at a starting time and an accelerating time. When a wheel on one side of the vehicle is raced on a bad road, etc., a large driving force is transmitted to the wheels on the other side by the stable initial torque as mentioned above so that properties for escaping the vehicle from the bad road are greatly improved.

Further, the initial torque generating mechanism is shortened in the axial direction by a construction in which, different from the conventional example, the washers 37, 37, the spring 39 and the thrust block 31 are arranged in a radial direction instead of the axial direction. Accordingly, it is also possible to easily form the differential apparatus 73 in which both the pinion gears 89, 91 have shaft portions 99, 107 and the respective second gear portions 95, 97, 103, 105 are engaged with each other on both axial sides of the side gears 15, 17 to extend the differential apparatus 73 in the axial direction.

In addition to this, in the differential apparatus 73, the thrust block 31, the washers 37, 37 and the spring 39 are floated and supported between the side gears 15 and 17 so that no complicated assembly order as in the conventional example is required. Further, the differential casing 75 can be constructed by a two-divisional structure so that cost of the differential apparatus is correspondingly reduced.

Figure 6:
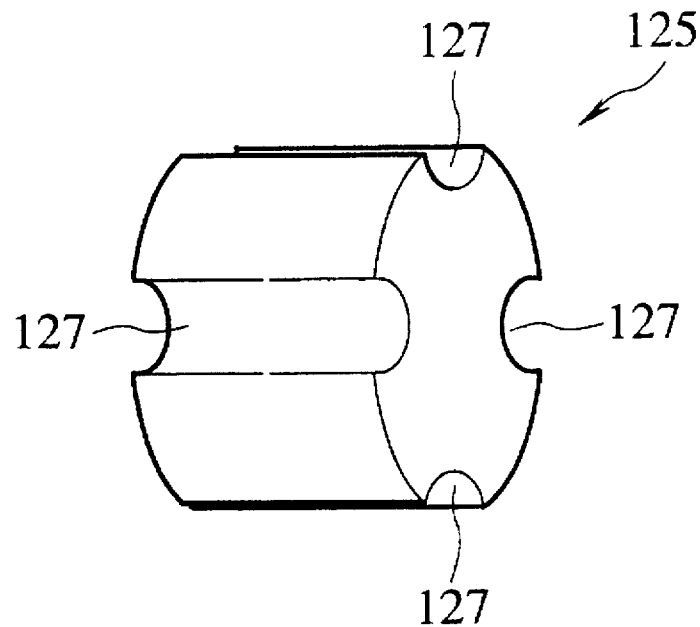
FIG. 6 is a perspective view showing another example of the thrust block used in the present invention.
Figure 7:
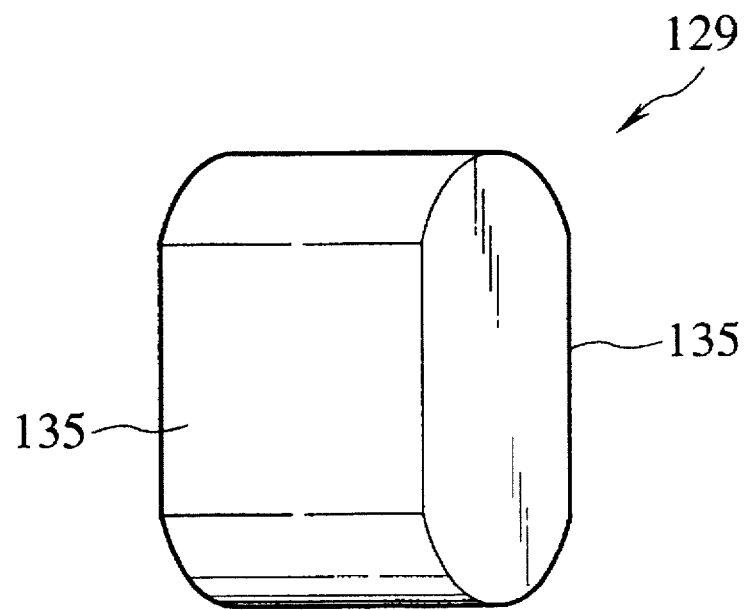
FIG. 7 is a perspective view showing another example of the thrust block used in the present invention.

The relation in connection between the washer members and the thrust block is not limited to a spline. FIGS. 6 and 7 show engaging portions except for the spline. In FIG. 6, a lug groove is formed as an engaging portion and a thrust block 125 has four round lug grooves 127. Washer members are circumferential projecting portions and are respectively movably engaged with these lug grooves 127 in an axial direction.

In FIG. 7, a chamfering portion is formed as an engaging portion. A thrust block 129 has two chamfering portions 135 and washer members are circumferential projecting portions and are respectively movably engaged with these chamfering portions 135 in an axial direction. In this construction, it is preferable to form a plurality of such chamfering portions so as to normally hold the relation in position between the thrust block and the washer members.

In such constructions for forming the lug grooves and the chamfering portions as engaging portions, processings are sequentially simplified and cost of the differential apparatus is reduced in comparison with the engaging portion of the spline.

Figure 8:
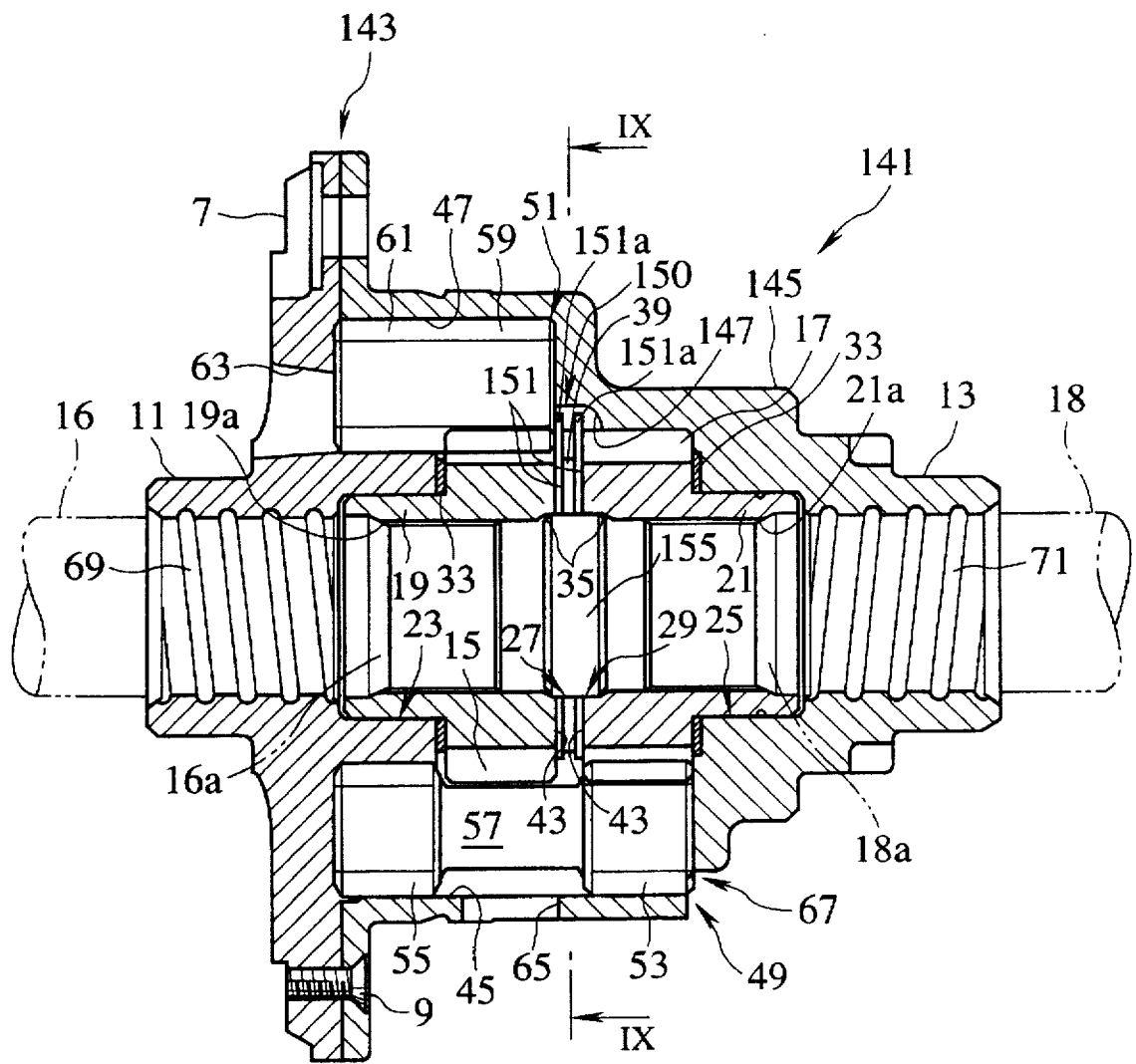
FIG. 8 is a cross-sectional view showing a third embodiment form of the present invention.
Figure 9:
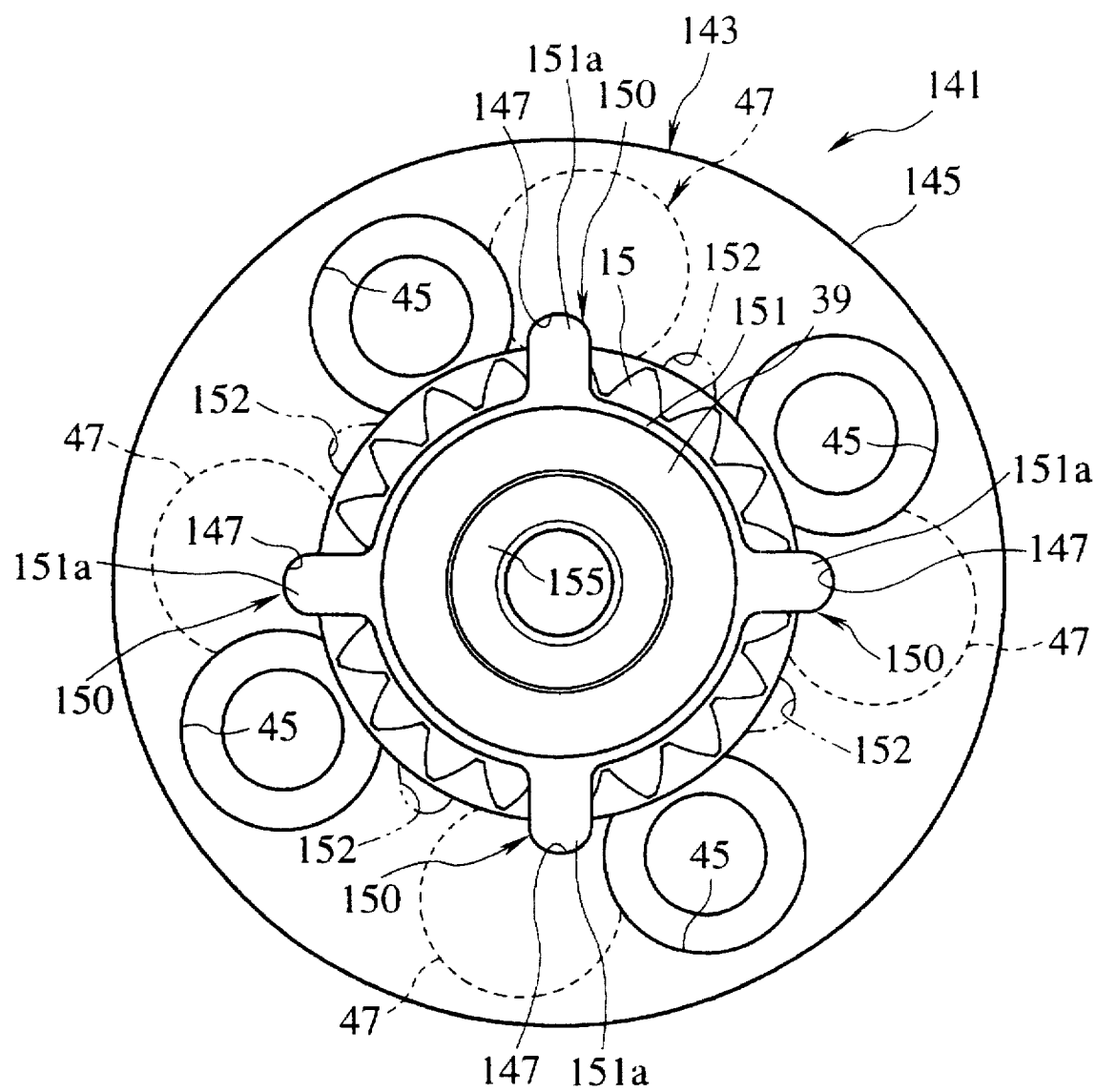
FIG. 9 is a cross-sectional view taken along line IX—IX of FIG. 8.

A third embodiment form of the present invention will next be explained with reference to FIGS. 8 and 9. FIGS. 8 and 9 show a differential apparatus 141 in this embodiment form. Left-hand and right-hand directions are those in FIG. 8 and members having no reference numerals, etc. are not illustrated.

In this embodiment form, a washer supporting member is set to a differential casing 143 instead of a thrust block. Washers 151, 151 are movably engaged with the differential casing 143 in an axial direction by an engaging portion 150 formed between these washers and the differential casing 143. This embodiment form has a construction approximately similar to that in the first embodiment except for this construction. In an explanation of this embodiment form and FIGS. 8 and 9, members having the same functions as members in the first embodiment form are designated by the same reference numerals and an explanation of these same functional members is omitted.

Namely, as shown in FIGS. 8 and 9, two washers 151, 151 are respectively opposed to side gears 15, 17 in radial outside portions (on an outer circumferential side of a thrust block 155) of output shafts 16, 18 so as not to receive thrust forces from the output shafts 16, 18. Engaging projections 151a, 151a are respectively projected on outer diameter sides from addendum ends of the side gears 15, 17 and are approximately equally formed in four positions in a circumferential direction in outer circumferential portions of the two washers 151, 151. Engaging projections 151a, 151a of the respective washers 151, 151 are correspondingly engaged with a casing body 145 constituting the differential casing 143 of the differential apparatus 141. An engaging lug portion 147 constituting the engaging portion 150 together with the engaging projections 151a, 151a is formed from a wall face of a storing hole 47 of the casing body 145 coming in contact with an end face of the pinion gear 51 by casting extraction, cutting work, etc.

A thrust block 155 is arranged over inner circumferences of large diameter portions 27, 29 formed inside boss portions 19, 21 of the respective side gears 15, 17 and supports respective free ends of the side gears 15, 17 to perform centering thereof. An outer circumferential face of the thrust block 155 is formed in a circular shape which is not particularly spline-processed. Inner circumferences of the washers 151, 151 are fitted to the outer circumference of the thrust block 155 with play and are guided by the thrust block 155. The washers 151, 151 are positioned in an axial direction by the pair of side gears 15, 17 after the washers are assembled.

Thus, the washers 151, 151 are pressed against sliding portions 43, 43 with respect to the side gears 15, 17 by a spring 39 in a state axially movable along the engaging lug portion 147 without receiving any thrust forces from the output shafts 16, 18 so that initial torque is generated in the sliding portions 43. The washers 151, 151 and the spring 39 are rotated together with the differential casing 143 in a circumferential direction. Therefore, the washers 151, 151 and the spring 39 are not rotated in association with the side gears 15, 17.

Accordingly, operating effects similar to those in the above first embodiment can be obtained.

Further, when the engaging lug portion 147 is cut, the cutting processing is started from an end face of the storing hole 47 of the pinion gear 51 so that a processing distance of the engaging lug portion 147 in its axial direction is shortened.

Since the engaging lug portion 147 is located on the end face of the pinion gear 51, a lubricating oil can be preferably supplied to the end face of the pinion gear 51 as a sliding frictional face.

Reference numeral 152 of a two-dotted chain line in FIG. 9 shows another forming example of the engaging lug portion. The engaging lug portion 152 can be also formed in an intermediate thickness portion of the differential body 145 adjacent to each of the storing holes 45, 47 of the pair of pinion gears 89, 91.

Figure 10:
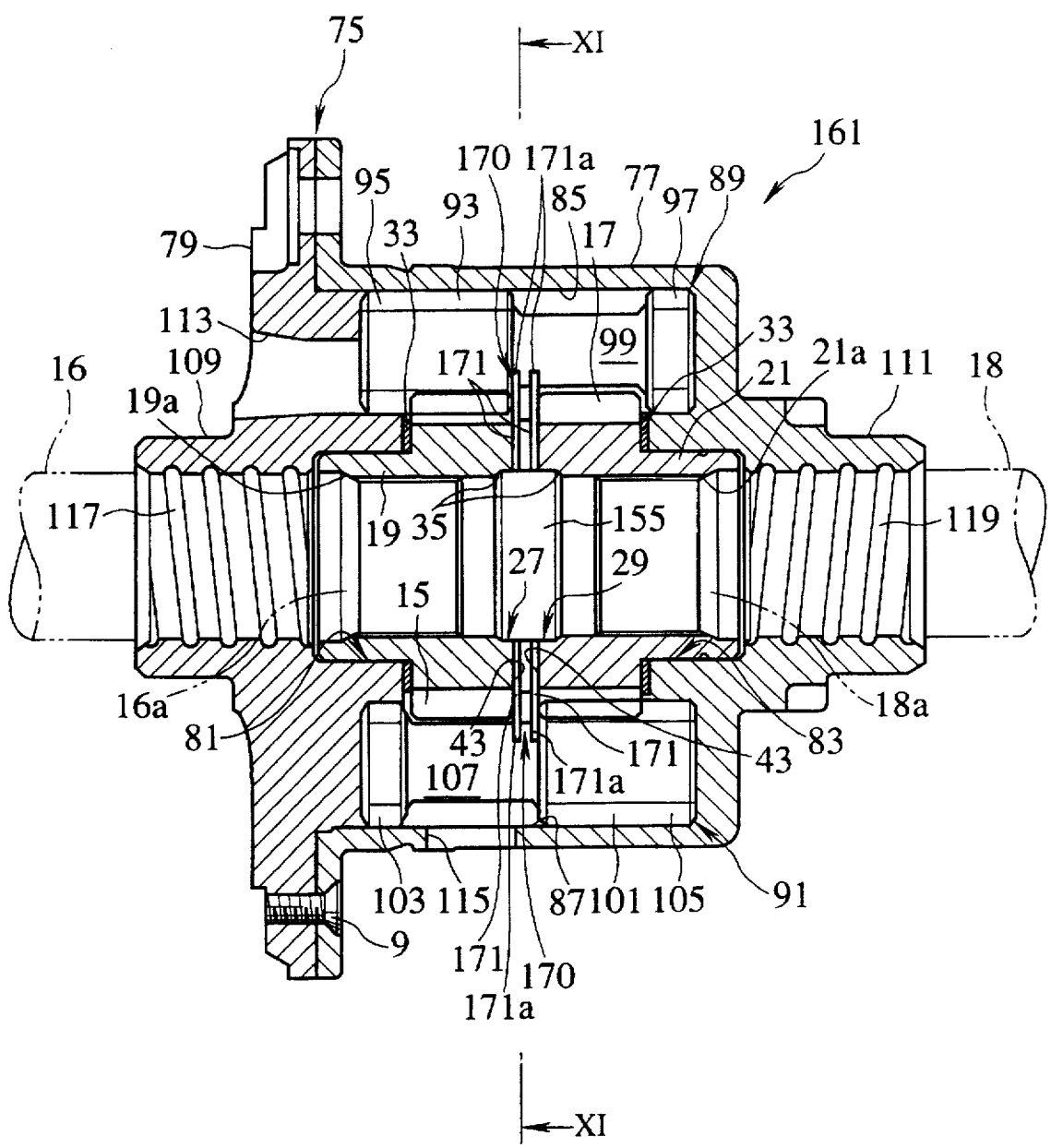
FIG. 10 is a cross-sectional view showing a fourth embodiment form of the present invention.
Figure 11:
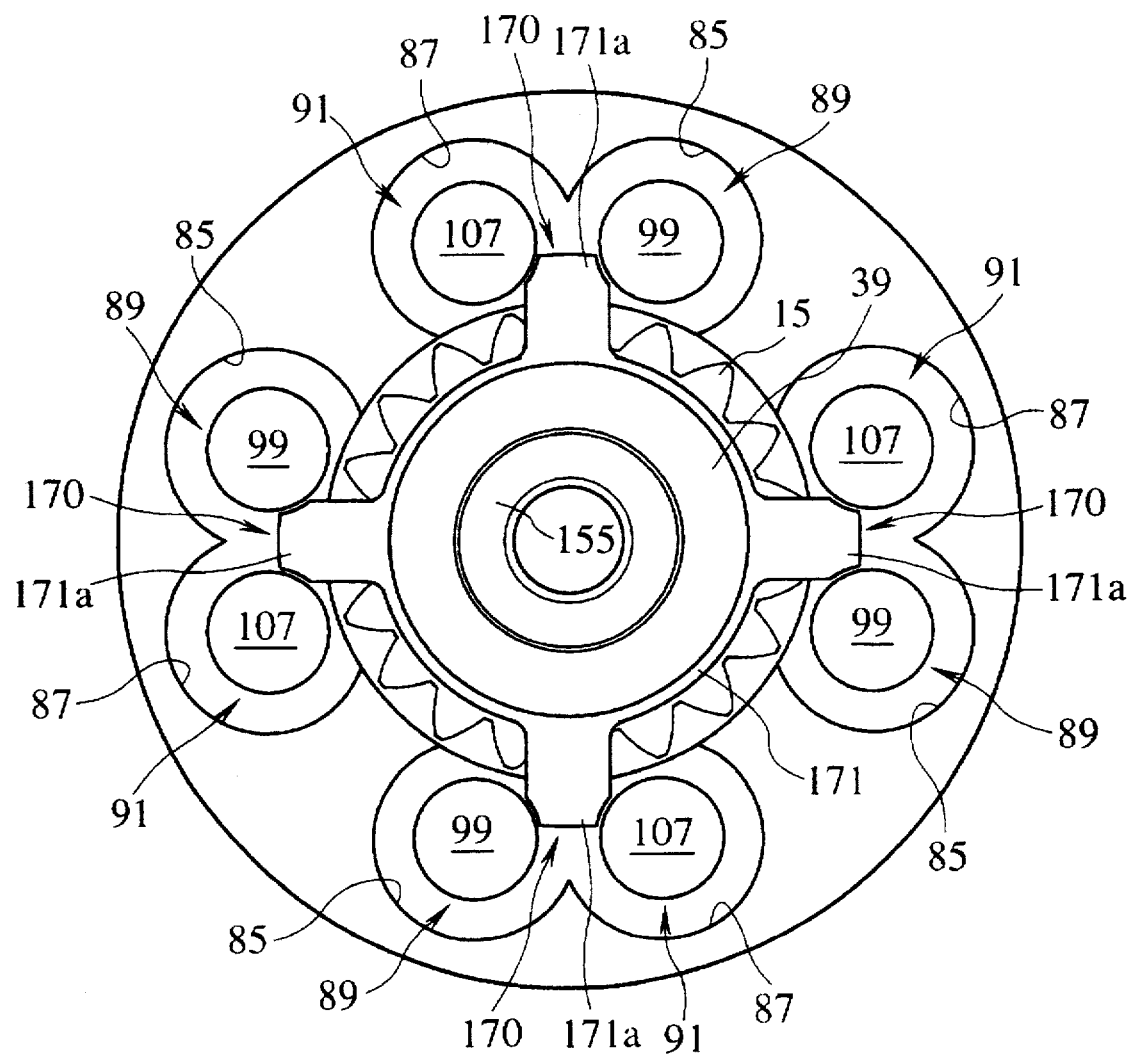
FIG. 11 is a cross-sectional view taken along line XI—XI of FIG. 10.

A fourth embodiment form of the present invention will next be explained with reference to FIGS. 10 and 11. FIGS. 10 and 11 show a differential apparatus 161 in this embodiment form. Left-hand and right-hand directions are those in FIG. 10 and members having no reference numerals, etc. are not illustrated.

In this embodiment form, a washer supporting member is set to pinion gears 89, 91 instead of a thrust block and washers 171, 171 are movably engaged with the pinion gears 89, 91 in an axial direction by an engaging portion 170 formed between the pinion gears 89 and 91. This embodiment form has a construction approximately similar to that in the second embodiment form except for this construction. In an explanation of this embodiment form and FIGS. 10 and 11, members having the same functions as members in the second embodiment form are designated by the same reference numerals and an explanation of these same functional members is omitted.

Namely, as shown in FIGS. 10 and 11, two washers 171, 171 are respectively opposed to side gears 15, 17 in radial outside portions (on an outer circumferential side of a thrust block 155) of output shafts 16, 18 so as not to receive thrust forces from the output shafts 16, 18. Engaging projections 171a, 171a are approximately equally formed in four positions in a circumferential direction in outer circumferential portions of the two washers 171, 171. The engaging projections 171a, 171a are respectively projected on an outer diameter side from addendum ends of the side gears 15, 17 and are located between shaft portions 99 and 107 of the pinion gears 89, 91. The engaging projections 171a, 171a come in contact with the shaft portions 99, 107 of the pinion gears 89, 91 and are engaged with these shaft portions so that rotations of the washers 171, 171 are restricted. The engaging projections 171a, 171a and the shaft portions 99, 107 constitute an engaging portion 170. An engaging recessed portion can be also formed in the washers 171, 171 such that the engaging recessed portion is engaged with only one shaft portion 99 (or 101) of the pinion gears 89, 91.

A thrust block 155 is arranged over inner circumferences of large diameter portions 27, 29 formed inside boss portions 19, 21 of the respective side gears 15, 17 and supports respective free ends of the side gears 15, 17 to perform centering thereof. An outer circumferential face of the thrust block 155 is formed in a circular shape which is not particularly spline-processed. Inner circumferences of the washers 171, 171 are fitted to the outer circumference of the thrust block 155 with play and are guided by the thrust block 155.

Thus, the washers 171, 171 are pressed against sliding portions 43, 43 with respect to the side gears 15, 17 by a spring 39 in a state movable in an axial direction along an extending direction of the shaft portions 99, 107 of the pinion gears 89, 91 without receiving any thrust forces from the output shafts 16, 18 so that initial torque is generated by the sliding portions 43.

Rotations of the washers 171, 171 and the spring 39 are restricted by the pinion gears 89, 91 and the washers 171, 171 and the spring 39 are rotated together with the differential casing 75 in a circumferential direction. Therefore, the washers 171, 171 and the spring 39 are not rotated in association with the side gears 15, 17.

Accordingly, operating effects similar to those in the above second embodiment form can be obtained.

Further, no engaging projections 171a, 171a of the washers 171, 171 are slidably engaged with addendums of the pinion gears 89, 91 by engaging the washers 171, 171 with the shaft portions 99, 107 of the pinion gears 89, 91. Therefore, addendum faces of the pinion gears 89, 91 can be protected. Accordingly, burning, galling, eccentric wearing, etc. can be prevented when the pinion gears 89, 91 are pressed against the storing holes 85, 87 by receiving an engaging reaction force and are frictionally slid into the storing holes 85, 87 while each of the pinion gears 89, 91 rotates on its own axis.

Since the engaging projections 171a, 171a are engaged with the shaft portions 99, 107 by utilizing a clearance between the shaft portions 99 and 107, it is not necessary to form a special engaging portion for an engagement with the washers 171, 171 in a partner side member (a washer supporting member). Accordingly, it is possible to construct the differential apparatus by a simple structure in which only the engaging projections 171a, 171a are formed in the washers 171, 171.

In the third and fourth embodiment forms, the thrust block 155 is formed, but the differential apparatus may be constructed such that no thrust block is formed. Namely the above constructions, the differential casing 143 or the pinion gears 89, 91 are set to the washer supporting member, are effective in the washer engaging structure in the differential apparatus no thrust block is formed. In this case, for example, engaging recessed and projected portions are formed in inner circumferential portions of the side gears 15, 17, and the washers and the spring are supported by an outer circumferential face on a projecting side of the engaging recessed and projected portions.

In the present invention, the pinion gears and the side gears may be constructed by spur gears instead of the helical gears. When the pinion gears and the side gears are constructed by spur gears, there is no differential limiting force caused by the engaging thrust force so that a ratio of initial torque occupied in the entire differential limiting force is increased. Accordingly, the effect in the present invention of stabilizing the initial torque particularly becomes particularly notable in the differential apparatus constructed by the spur gears. The present invention can be also applied to the differential apparatus of a type in which mutual engaging portions of the pinion gears are located on an axial inner side of both the side gears.

The differential apparatus in the present invention can be used in a front diff (a differential apparatus arranged on an axle on a front wheel side), a rear diff (a differential apparatus arranged on an axle on a rear wheel side), and a center diff (a differential apparatus for distributing driving force of an engine to the front and rear wheel sides).

What is claimed is:

1. A differential apparatus comprising:

a differential casing rotated by driving force of an engine;

a pair of side gears on an output side rotatably supported within the differential casing and respectively spline-connected to output shafts;

at least one pair of pinion gears which have first gear portions arranged on a radial outer side of these side gears and separately engaged with the side gears and have second gear portions engaged with each other;

storing holes formed in the differential casing and slidably and rotatably storing the respective pinion gears;

a pair of washer members respectively opposed to the side gears in radial outside portions of the output shafts and movably arranged in an axial direction so as not to receive thrust forces from the output shafts; and a spring arranged between said washer members and giving frictional torque to both the side gears through the washer members.

2. The differential apparatus as claimed in claim 1, wherein the pair of washer members are engaged with a washer supporting member rotatable in relation to the side gears and are rotated together with the washer supporting member in a circumferential direction.

3. The differential apparatus as claimed in claim 2, wherein a thrust block is rotatably arranged in relation to the side gears on an axial inner side of both the side gears and receives the thrust forces of said output shafts.

4. The differential apparatus as claimed in claim 3, wherein the thrust block constitutes the washer supporting member rotatable in relation to the side gears; and the pair of washer members are movably engaged with the thrust block in the axial direction by an engaging portion formed between the pair of washer members and the thrust block.

5. The differential apparatus as claimed in claim 2, wherein the differential casing constitutes the washer supporting member rotatable in relation to the side gears; and the pair of washer members are movably engaged with the differential casing in the axial direction by an engaging portion formed between the pair of washer members and the differential casing.

6. The differential apparatus as claimed in claim 2, wherein the pinion gears constitute the washer supporting member rotatable in relation to the side gears; and the pair of washer members are movably engaged with the pinion gears in the axial direction by engaging portions formed between the pair of washer members and the pinion gears.

7. The differential apparatus as claimed in claim 1, wherein at least one pinion gear of the pair of pinion gears has a shaft portion having a small diameter and avoiding an interference with the side gears engaged with the pinion gears on a partner side between the first and second gear portions.

8. The differential apparatus as claimed in claim 3, wherein the differential casing constitutes the washer supporting member rotatable in relation to the side gears; and the pair of washer members are movably engaged with the differential casing in the axial direction by an engaging portion formed between the pair of washer members and the differential casing.

9. The differential apparatus as claimed in claim 3, wherein the pinion gears constitute the washer supporting member rotatable in relation to the side gears; and the pair of washer members are movably engaged with the pinion gears in the axial direction by engaging portions formed between the pair of washer members and the pinion gears.

* * * * *